(12) United States Patent
Quinn et al.

(10) Patent No.: US 10,855,799 B2
(45) Date of Patent: Dec. 1, 2020

(54) MANAGEMENT OF NETWORK CONNECTIONS AND PRIORITIES BASED ON DEVICE PROFILES

(71) Applicant: Dell Products, L.P., Round Rock, TX (US)

(72) Inventors: Liam B. Quinn, Austin, TX (US);
Carlton A. Andrews, Austin, TX (US);
Yuan-Chang Lo, Austin, TX (US);
Jason A. Shepherd, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 457 days.

(21) Appl. No.: 15/414,105

(22) Filed: Jan. 24, 2017

(65) Prior Publication Data

US 2018/0212844 A1 Jul. 26, 2018

(51) Int. Cl.
*H04L 29/08* (2006.01)
*H04L 12/26* (2006.01)
*H04L 12/24* (2006.01)

(52) U.S. Cl.
CPC ........ *H04L 67/303* (2013.01); *H04L 41/0823* (2013.01); *H04L 41/0853* (2013.01); *H04L 43/0876* (2013.01)

(58) Field of Classification Search
CPC ............... H04L 67/303; H04L 41/0823; H04L 41/0853; H04L 43/0876
USPC ......................................................... 709/224
See application file for complete search history.

(56) References Cited

U.S. PATENT DOCUMENTS

| | | |
|---|---|---|
| 2010/0039992 A1 | 2/2010 | Prakash et al. |
| 2015/0067172 A1* | 3/2015 | Ashokan ............... H04L 67/101 709/226 |
| 2016/0006837 A1 | 1/2016 | Reynolds et al. |
| 2016/0066137 A1 | 3/2016 | Kulkarni et al. |
| 2016/0072832 A1* | 3/2016 | Kim .................... H04L 63/1425 726/23 |
| 2016/0226732 A1* | 8/2016 | Kim ................ H04W 12/04031 |
| 2016/0309496 A1 | 10/2016 | Huang et al. |
| 2017/0086084 A1* | 3/2017 | Jarvis .................... H04W 24/06 |

* cited by examiner

*Primary Examiner* — James E Springer
*Assistant Examiner* — Patrick F Ngankam
(74) *Attorney, Agent, or Firm* — Fogarty LLP (57) ABSTRACT

Systems and methods for managing network connections and priorities based on device profiles are described. In some embodiments, an Information Handling System (IHS) may include a processor and a memory coupled to the processor, the memory having program instructions stored thereon that, upon execution by the processor, cause the IHS to: receive instrumentation data from a plurality of devices coupled to the IHS via a network; receive observation data from the plurality of devices; correlate the observation data with the instrumentation data; and configure communications between the IHS and one or more the plurality of devices based, at least in part, upon the correlation.

19 Claims, 3 Drawing Sheets

MANAGEMENT OF NETWORK CONNECTIONS AND PRIORITIES BASED ON DEVICE PROFILES

FIELD

The present disclosure generally relates to Information Handling Systems (IHSs), and, more particularly, to systems and methods for managing network connections and priorities based on device profiles.

BACKGROUND

As the use and value of information continues to increase, individuals and businesses seek additional ways to process and store information. One option is an Information Handling System (IHS). An IHS generally processes, compiles, stores, and/or communicates information or data for business, personal use, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, In an IHS network, devices may encounter problems when attempting to use finite network resources. For example, network communications may become slow, congested, and/or unreliable if there are too many devices concurrently requesting channels from the same access point or station. To address these various issues, the inventors hereof have developed techniques for managing network connections and priorities based on device profiles.

SUMMARY

Embodiments of systems and methods for managing network connections and priorities based on device profiles are described herein. In an illustrative, non-limiting embodiment, an Information Handling System (IHS) includes a processor; and a memory coupled to the processor, the memory having program instructions stored thereon that, upon execution by the processor, cause the IHS to: receive instrumentation data from a plurality of devices coupled to the IHS via a network; receive observation data from the plurality of devices; correlate the observation data with the instrumentation data; and configure communications between the IHS and one or more the plurality of devices based, at least in part, upon the correlation.

At least one of the plurality of devices may be static. In this case, instrumentation data may include at least one of the following: a device name, an available connection, a device type, an access point capability, a MAC address, a cost optimization selection, or a location. Moreover, at least one of the plurality of devices may be mobile. In that case, the instrumentation data may include at least one of: a job priority, a bandwidth needed, a broadcast frequency, a duration of broadcast, mobility, a minimum acceptable latency, or a connection reliability per channel. Meanwhile, the observation data may include at least one of the following: a radio name, a signal strength, a signal-to-noise ratio, a data rate, a bandwidth, an available frequency band, or an interference across bands.

In various embodiments, the program instructions may further cause the IHS to: determine that a portion of the instrumentation data related to a given device does not match a corresponding portion of the observation data related to the given device, and to perform at least one of the following: (a) disregard the portion of the observation data related to the given device in response to the given device being a mobile device, or (b) disregard the portion of the instrumentation data related to the given device in response to the given device being a static device.

For example, configuring the communications may include configuring at least one of: a frequency channel, a transmit power, or a frame size. Also, in some cases, the program instructions may further cause the IHS to assign a connection priority to each connection of each of the plurality of devices based upon the correlation, and/or to change a connection priority of a given device based upon a determination that the given device has not reported information expected to be received by the IHS.

The network may include an Internet-of-Things ("IoT") network. For instance, the plurality of devices may be physically dispersed within a premises, such that an item physically moves within the premises, wherein, in a first time interval, the item is closer to a first set of devices than a second set of devices, wherein, in a second time interval, the item is closer to the second set of devices than the first set of devices. In this particular case, configuring the communications may include: (a) prioritization of communications between the IHS and the first set of devices to the detriment of communications between the IHS and the second set of devices during the first time interval, and (b) prioritization of communications between the IHS and the second set of devices to the detriment of communications between the IHS and the first set of devices during the second time interval.

Additionally or alternatively, a first device from the first set of devices may have a first connection speed requirement and a first bandwidth requirement, a second device from the second set of devices may have a second connection speed requirement and a second bandwidth requirement. Assume that the second speed requirement is greater than the first speed requirement, and the first bandwidth requirement is larger than the second bandwidth requirement. In this case, configuration of the communications may include prioritization of a first connection with the first device over a second connection with the second device. Prioritization of the first device over the second device may occur during the first time interval and/or during the second time interval.

In another illustrative, non-limiting embodiment, a method may implement one or more of the aforementioned operations. In yet another illustrative, non-limiting embodiment, a memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

A. OVERVIEW

In modern IHS networks, radios that employ standard frequencies and channels are proliferating. Devices are no longer exclusively "consumers" of dedicated access points (APs), but rather also behave as APs themselves. This results in management and interference avoidance complexities among various PAN, WLAN, and, in certain cases, with implementations of WWAN networks designed to operate in unlicensed WLAN/WAPN networks, which can create congestion and efficiency issues. To address these and other problems, systems and methods for managing network connections based on device profiles are described herein.

In various embodiments, client management instrumentation describing a device's characteristics (e.g., mobility, location, radios, frequency bands, channels, etc.) and observations (e.g., radios and power it sees), along with additional instrumentation describing its communications needs (e.g., QoS, bandwidth, intermittency, etc.), collectively referred to as "device profiles," may enable a controller to optimize a wireless environment.

In some cases, instrumentation information stored within a given device may identify if that device is fixed or mobile. This information may be used, for example, to determine the device's effect on weighting for long or short term changes. Additionally or alternatively, instrumentation may describe device transmission requirements, QoS needed, prioritization, channel selection, and/or service bandwidth for each radio. Additionally or alternatively, instrumentation may include the device's current location, coordinates, power budget, and/or proximity information.

In various embodiments, device instrumentation information may be obtained and provided via a service, software, or program instructions executed by the device itself. Examples of such service include, but are not limited to, the Dell™ OpenManage™ Client Instrumentation (OMCI) software or the "Dell Command|Monitor" service, both available from DELL, INC.

In some implementations, observation information may be gathered by commanding all available radios to report what they can receive, including, for example, all APs and signal strengths around it, as well as all other devices it can detect. Temporary agent "sniffers" may be deployed to establish the context and environment of operation, or the "lay of the land," which may survey the environment but are not in continuous operation for connection devices. Radio observations may be collected through an Application Programming Interface (API).

Finally the controller may optimize the wireless environment, for example, by adjusting every device's radio transmission connection and characteristics based upon a correlation between the instrumentation and the observations.

As such, systems and methods described herein include management instrumentation that provides details of device type, mobility, location, etc. and also service need characteristics such as QoS, bandwidth, etc. of each radio. Management agents report characteristics of all observable radio transmissions of the devices around, essentially generating a real-time mapping of the overall operating environment. Selection of appropriate communication networks and automatic reconnection of devices may be performed based on the device's location and needs.

Techniques described herein may use instrumentation that conveys service needs from the client (or client application) perspective. In some cases, the client sets up the requirements and not a centralized service. These techniques may also include observance of radio information collected by any client and weighted by the characteristics of that client as known from inventory by the management system.

Also, observances are correlated with the central management's knowledge of observed client devices. As part of the correlation operation, these techniques may determine whether clients are transient (e.g., mobile devices), the broadcast and sample rates of each device, whether one likely to only burst data for a given time interval and then disappear for a longer period of time, etc. Finally, these techniques may include dynamic optimization of transmission and reception characteristic of all devices based on the foregoing and the current needs of the current network, both WLAN, PAN, and WWAN.

In various implementations, systems and methods described herein may be immediately applicable to the Internet-of-Things ("IoT"), which is an inter-networking of "things" or "objects" (generally referred to as "IoT devices") that promotes the collection and exchange of data among those objects. Generally speaking, IoT technology is based on the principle that IoT devices (e.g., clients, sensors, etc.) may operate with low-power components that enable them to function remotely across a network infrastructure, integrating the physical world into computer-based systems using a variety of different communication protocols. In the near future, it is expected that IoT will automate nearly every field of human endeavor.

Figure 1:
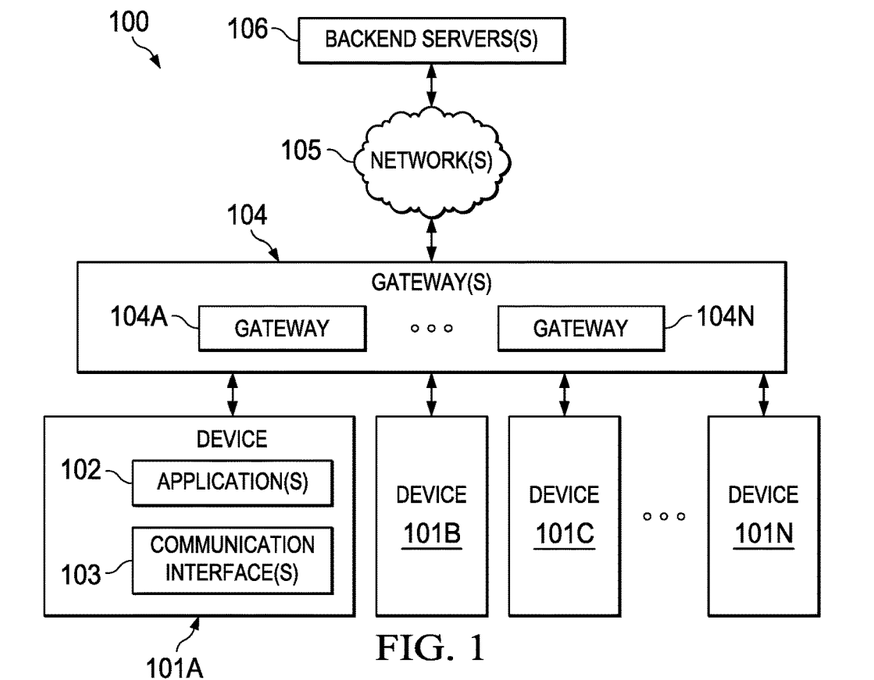
FIG. 1 illustrates an example of an Information Handling System (IHS) network according to some embodiments.

Turning to FIG. 1, an example of IHS network 100 is depicted according to some embodiments. As shown, devices 101A-N (generally referred to as 101) may be coupled to a backend server(s) 106 via one or more gateways 104A-N (generally referred to as 104) and one more network(s) 105. At least one (and typically most) of devices 101A-N may be wireless telecommunication devices. Examples of wireless telecommunications devices include, but are not limited to, laptops, mobile phones (e.g., cell phones, smartphones, etc.), tablets, augmented/virtual reality (AR/VR) glasses, etc.

Backend server(s) 106 may comprise a single computer, a network of computers, or a distributed system. It should be noted that, although server(s) 106 are referred to as "backend server(s)" and are connected to gateway(s) 104 via network 105, there is no requirement that server(s) 106 be remotely located with respect to gateway(s) 104. That is, server(s) 106 may be co-located with respect to gateway(s)

104, and in some cases both components may be implemented as a single physical entity.

Similarly, although gateway(s) 104A-N are illustrated as being in direct communication with devices 101A-N, there is no requirement that gateway(s) 104A-N be local with respect to devices 101A-N. In fact, in many cases, network 105 may also enable communications between gateways(s) 104 and devices 101A-N.

In many implementations, any of gateway(s) 104A-N and/or device(s) 101A-N may be APs. Additionally or alternatively, other APs (not shown in FIG. 1) may provide a wireless interface between devices 101A-N and gateway(s) 104A-N. In fact, IoT devices with embedded wireless enabled sensors can act as pass through platforms for other adjacent devices or sensors, thereby providing the capability to assemble and disassemble ad-hoc, wireless mesh networks.

As described herein, gateway(s) 104A-N and/or server(s) 106 may be configured to determine network topologies, identify transmission paths, optimize transmission paths, properly time device transmissions, and/or select transmission channels.

Network 105 may include any suitable computer or telecommunications network. Examples of wireless networks include, but are not limited to: Wi-Fi, Bluetooth, BLE, ZigBee, Z-wave, 6LoWPAN, Thread, Sigfox, LoRA, WirelessHD, WiGig, HaLow, NFC, RFID, Ingenu, Weightless, ANT, DigiMesh, MiWi EnOcean, Dash7, or WirelessHART networks, cellular networks (e.g., second generation (2G), third generation (3G), fourth generation (4G), Long Term Evolution (LTE), fifth generation (5G)), and satellite networks. Conversely, examples of wired networks include, but are not limited to, Ethernet, cable, optical fiber, USB, DSL, PowerLine, HomePlug, and Public Switched Telephone Networks (PSTN).

Each device 101 may include one or more application(s) 102 and one or more (typically two or more) communication interfaces(s) 103. In various embodiments, these components may be provided in the form of program instructions executable by device 101. In some cases, different application(s) 102 may be written in different languages. Examples of suitable programming languages include, but are not limited to: Java, C, Javascript, C++, Python, Node.js, PHP, Lua, C #, Ruby, Assembler, Go, SWIFT, Rust, Parasail, B #, etc.

Again, in most cases each device 101 has two or more communication interfaces 103. These interfaces 103 may operate with multiple wireless frequency bands and protocols. Application(s) 102 may integrate the device 101's Operating System (OS) and the device 101's hardware to detect and utilize wired and wireless network interfaces 103 of device 101 through one or more device drivers. In some cases, application(s) 102 may manage wireless interfaces, detect neighboring devices and gateways, and maintain a routing table of instructions.

In some cases, application(s) 102 may be provided in the form of a management agent that resides on device 101. The management agent may provide observation and instrumentation information to gateway(s) 104, as described in more detail below.

In some embodiments, the various devices 101 and gateways 104 may form or comprise one or more hybrid networks or sub-networks, whereby each device is in transmission or receiving range of at least one other device in the set, and where each entity is referred to as a "node." These networks or sub-networks are so-called "hybrid" in that that they may operate across multiple types of wireless transmission channels (e.g., Wi-Fi, Bluetooth, cellular, etc.). It is expected that, in the near future, "super smart" IoT devices may include complex features that enable capabilities to switch its communications between different (e.g., licensed or unlicensed) spectrum domains. Devices may be added or removed from the network at any given time, such that the network topology may change over time.

Within IHS network 100, there may be one or more paths between any two nodes—e.g., between device 101A (or device A) and gateway 104N (or device B). The direction of a path typically corresponds to a transmission direction. That is, for any two devices (device A and device B) in a network or sub-network, the path from device A to device B is not necessarily the same as the path from device B to device A. Moreover, in some cases there may be a path from device A to device B but not from device B to device A. Thus, device A may be able to communicate with device B, but not vice versa.

A hybrid path contains path segments that use different communication interfaces. For example, if a path extends from device A through device B to device C, the first portion or segment (device A to device B) may use a different protocol or interface than the second portion or segment (device B to device C). In general, when two devices communicate using multiple interfaces, each interface constitutes its own path.

In some embodiments, server 106 may create and/or maintain a representation of IHS network(s) 100 formed among devices 101, among gateways 104, and between devices 101 and gateways 104. In some embodiments, such a representation may include, for example, one or more of: communication interfaces of each device 101, location of each device 101, communication interfaces of each gateway 104, location of each gateway 104, potential connections among devices 101, potential connections among gateways 104, and/or potential connections between devices 101 and gateways 104.

In other embodiments, gateways 104 store the network representation including, for example, the communication interfaces of each device 101, the location of each device 101, communication interfaces of each gateway 104, location of each gateway 104, potential connections among devices 101, potential connections among gateways 104, and/or potential connections between devices 101 and gateways 104.

In some cases, the aforementioned network representation may be stored across a plurality of databases including, for example: a network topology database, a device information database, a gateway information database, a communication interface database, and a network resources database. Additionally or alternatively, the representation may be stored in a table and presented to a user or network administrator in a suitable manner, such as, for example, via a graphical user interface.

In operation, server(s) 106 and/or gateways 104 may be configured to perform aggregation and maintenance of virtual representations of interfaces in the network, aggregation and maintenance of potential virtual connections in the network, and optimal path generation for data transmissions. As such, server(s) 106 and/or gateways 104 may be capable of coordinating the flow of data in the network by combining instrumentation data with observation data (both pieces of information provided by devices 101 and/or gateways 104) to make connection and routing decisions.

Here it should be emphasized that IHS network 100 is depicted for sake of illustration only. There are infinite different configurations possible in any given IHS deployment. Particularly in the case of IoTs, it is often desirable that a given installation remain flexible, so that new and different IoT devices, gateways, switches, access points, servers, services, etc. may be added, removed, or replaced, as the network evolves over time. Although the techniques discussed herein are immediately applicable to the example IHS network 100 of FIG. 1, it is understood that the same techniques may be equally applied to any IHS or IoT environment.

B. HARDWARE

In some embodiments, one or more of device(s) 101, gateway(s) 104, and/or server(s) 106 shown in FIG. 1 may be implemented as an Information Handling System (IHS).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes.

For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of NVMs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
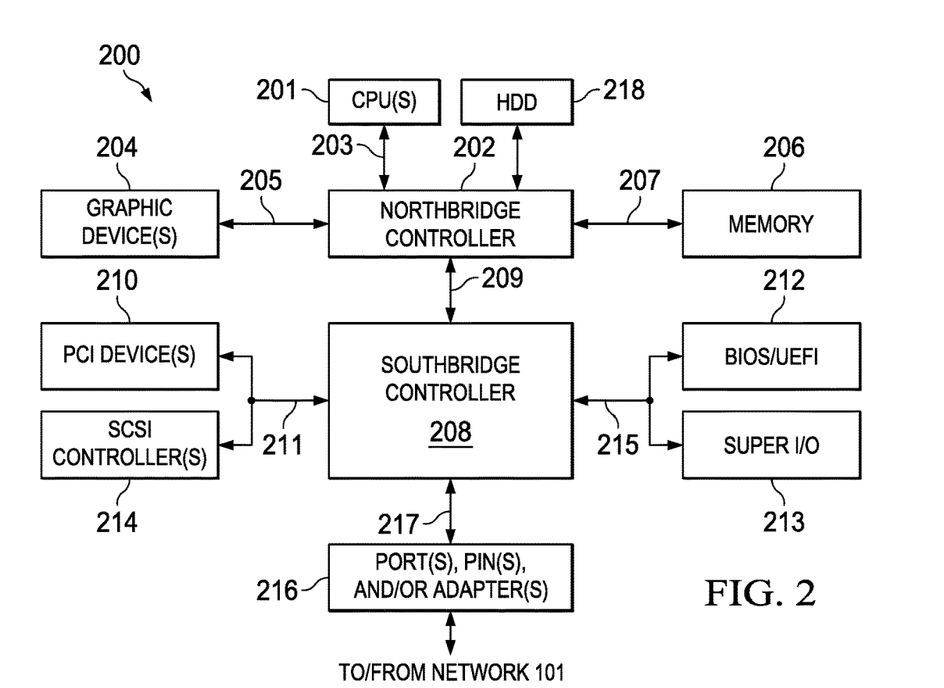
FIG. 2 illustrates an example of an IHS according to some embodiments.

FIG. 2 is a block diagram of an example of an IHS. Although IHS 200 may be used to build any component shown in FIG. 1, it is particularly applicable to implementations of gateway(s) 104.

As shown, IHS 200 includes one or more CPUs 201. In various embodiments, IHS 200 may be a single-processor system including one CPU 201, or a multi-processor system including two or more CPU(s) 201 (e.g., two, four, eight, or any other suitable number). CPU(s) 201 may include any processor capable of executing program instructions. For example, in various embodiments, CPU(s) 201 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

CPU(s) 201 are coupled to northbridge controller or chipset 202 via front-side bus 203. Northbridge controller 202 may be configured to coordinate I/O traffic between CPU(s) 201 and other components. For example, in this particular implementation, northbridge controller 202 is coupled to graphics device(s) 204 (e.g., one or more video cards or adaptors) via graphics bus 205 (e.g., an Accelerated Graphics Port or AGP bus, a Peripheral Component Interconnect or PCI bus, or the like).

Northbridge controller 202 is also coupled to system memory 206 via memory bus 207, and to hard disk drive (HDD) 218. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory. Conversely, HDD 218 may include any magnetic, solid-state (SSD), or hybrid data storage device capable of storing an OS and other applications.

In operation, CPU(s) 201 execute program instructions that are stored in memory 206 and/or HDD 218. Under control of those instructions, IHS 200 may be configured to provide a number or services described in more detail below.

Northbridge controller 202 is coupled to southbridge controller or chipset 208 via internal bus 209. Generally speaking, southbridge controller 208 may be configured to handle various of IHS 200's I/O operations, and it may provide interfaces such as, for instance, Universal Serial Bus (USB), audio, serial (e.g., RS232, RS485, CANbus, RS422, etc.), parallel, Ethernet, or the like via port(s), pin(s), and/or adapter(s) 216 over bus 217.

For example, southbridge controller 208 may be configured to allow data to be exchanged between IHS 200 and other devices, such as other IHSs attached to a network (e.g., network 105). In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 208 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 208 is further coupled to one or more PCI devices 210 (e.g., modems, network cards, sound cards, or video cards) and to one or more SCSI controllers 214 via parallel bus 211.

Southbridge controller 208 is also coupled to BIOS/UEFI 212 and to Super I/O Controller 213 via Low Pin Count (LPC) bus 215. BIOS/UEFI 212 includes non-volatile memory having program instructions stored thereon. Those instructions may be usable by CPU(s) 201 to initialize and test other hardware components and/or to load an Operating System (OS) onto IHS 200. Super I/O Controller 213 combines interfaces for a variety of lower bandwidth or low data rate devices. Those devices may include, for example, floppy disks, parallel ports, keyboard and mouse, temperature sensor and fan speed monitoring/control, among others. In various implementations, southbridge controller 208 may be configured to allow data to be exchanged between BIOS/UEFI 212 and another IHS attached to network 105 (e.g., a remote server or other source of technical service) using wired or wireless capabilities of network adapter 216.

In some cases, IHS 200 may be configured to provide access to different types of computer-accessible media separate from memory 206. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 202 and/or southbridge controller 208.

The terms "physical," "hardware," "tangible," and "non-transitory," when used in the context of computer-readable storage or memories, are intended to describe devices excluding propagating electromagnetic signals; but are not intended to otherwise limit the type of physical storage device. For instance, the aforementioned terms are intended to encompass types of hardware, physical storage devices that do not necessarily store information permanently, including, for example, RAM. Program instructions and data stored on a physical memory device in non-transitory form may afterwards be transmitted by transmission media or signals such as electrical, electromagnetic, or digital signals, as an entirely separate or independent process, which may then be conveyed via a communication medium such as a network and/or a wireless link. In other words, although program instructions in and of themselves may be transitory in some manner, the physical device that actually stores those program instructions are physical, real-word objects, and therefore are non-transitory.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 202 may be combined with southbridge controller 208, and/or be at least partially incorporated into CPU(s) 201. In other implementations, one or more of the devices or components shown in FIG. 2 may be absent, or one or more other components may be present. For instance, in some cases, IHS 200 may include a Trusted Platform Module (TPM) or secure cryptoprocessor, not shown in FIG. 2 for sake of simplicity. But it should be readily understood that the systems and methods described herein may be implemented or executed with other IHS configurations.

In various embodiments, IHS 200 may be contained within a chassis, case, or other enclosure. And, in many applications, such a chassis may have an industrial or rugged design that can be fan-less, operate within a temperature range (e.g., 0° C.-50° C.), support multiple power supplies and/or wireless antennas, etc.

Figure 3:
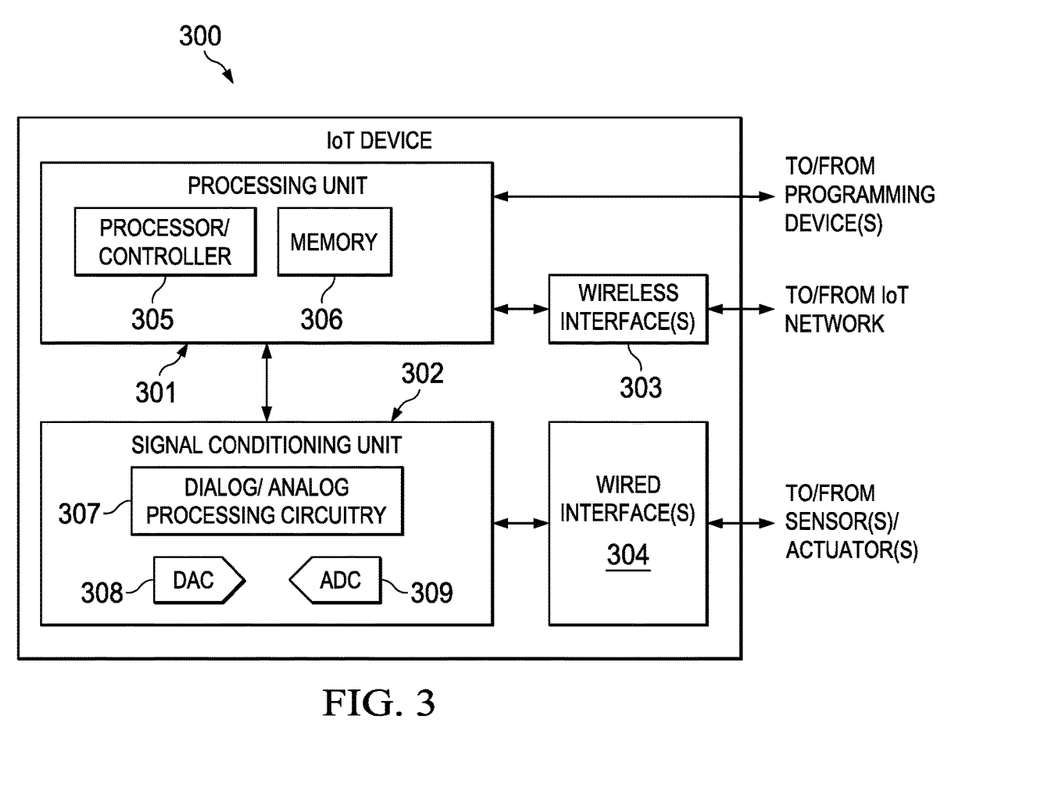
FIG. 3 illustrates an example of an IoT device according to some embodiments.

Referring now to FIG. 3, any given one of devices 101 of FIG. 1 may be implemented as IoT device 300. It should be noted, however, that IoT device architectures typically vary widely from device to device. Generally speaking, IoT devices range from legacy sensors and actuators (e.g., interfaced via adaptors, hubs, or other circuitry that provides network connectivity) to sophisticated embedded devices and IHSs, such as IHS 200 of FIG. 2.

Therefore, although IoT device 300 is likely to be found in a modern IoT environment, it should also be kept in mind that the various components of IoT device 300 are discussed for sake of illustration only. It should be readily understood that embodiments described herein may be implemented or executed with other IoT device configurations.

Referring back to FIG. 3, IoT device 300 includes processing unit 301, signal conditioning unit 302, wireless interface 303, and wired interface 304. Processing unit 301 includes processor or controller 305 and memory 306. Signal conditioning unit 302 includes digital/analog processing circuitry 307, digital-to-analog converter (DAC) 308, and analog-to-digital converter (ADC) 309.

Wireless interface 303 may include any hardware, circuitry, and/or software that enables IoT device 300 to receive and/or transmit data over a wireless medium. Examples of wireless networks include, but are not limited to, Wi-Fi, Bluetooth, BLE, ZigBee, Z-wave, 6LoWPAN, Thread, Sigfox, LoRA, WirelessHD, WiGig, HaLow, NFC, RFID, Ingenu, Weightless, ANT, DigiMesh, MiWi EnOcean, Dash7, or WirelessHART networks, cellular networks (e.g., second generation (2G), third generation (3G), fourth generation (4G), a Long Term Evolution (LTE), a fifth generation (5G) network), and satellite networks. Typically, wireless interface(s) 303 are used to communicate data between IoT devices, IoT gateways, backend servers, etc. ("to/from IoT network").

Wired interface 304 may include any hardware, circuitry, and/or software that enables IoT device 300 to receive and/or transmit data over a wired medium. Examples of wired networks include Ethernet, cable, optical fiber, USB, HDMI, DSL, PowerLine, HomePlug, HomePNA, X10, and Public Switched Telephone Networks (PSTN). Similarly as above, wired interface(s) 304 may also be used to communicate data over an IoT network.

Additionally or alternatively, wired interface 304 may include circuitry configured to receive and transmit digital signals or data such as, for example, RS232, RS485, CANbus, RS422, USB, video signals (e.g., to and from a monitor or camera), and GPIO. Additionally or alternatively, wired interface 304 may be used to transmit and receive analog signals usable to indicate and/or to control the status of buttons, switches, contactors, actuators, etc. ("to/from sensor(s)/actuator(s)").

Processor or controller 305 and memory 306 operate similarly as CPU(s) 201 and memories 206 and 218 of IHS 200. That is, processor 305 executes program instructions that are either stored in the processor itself or in memory 306. Under control of those instructions, IoT device 300 may be configured to provide a number or services described in more detail below. In some cases, a programming device may provide such instructions to processor/controller 305 using a dedicated PLC interface or the like ("to/from programming device(s)").

Digital/analog processing circuitry 307 may include any digital or analog circuitry configured condition input or output signals that are received or transmitted by IoT device 300, particularly through wired interface(s) 304. For example, analog signals may be transmitted using DAC circuitry 308 and received using ADC circuitry 309. Accordingly, processing circuitry 307 may include any signal processing circuit (DSP), filter, amplifier, mixer, integrator, limiter, oscillator, impedance, rectifier, etc. In some cases, digital/analog processing circuitry 307 may be integrated into processor/controller 305.

It should be noted that, it many applications, any hardware equipment used to interconnect any component in an IoT network may itself be an IoT device (e.g., a wireless access point, a network switch, a legacy sensor hub or aggregator, etc.). Additionally or alternatively, in many applications, otherwise conventional IHS devices, such as, for example, computers, desktops, smart phones, tablets, etc., may also operate as IoT devices.

C. SERVICES

Figure 4:
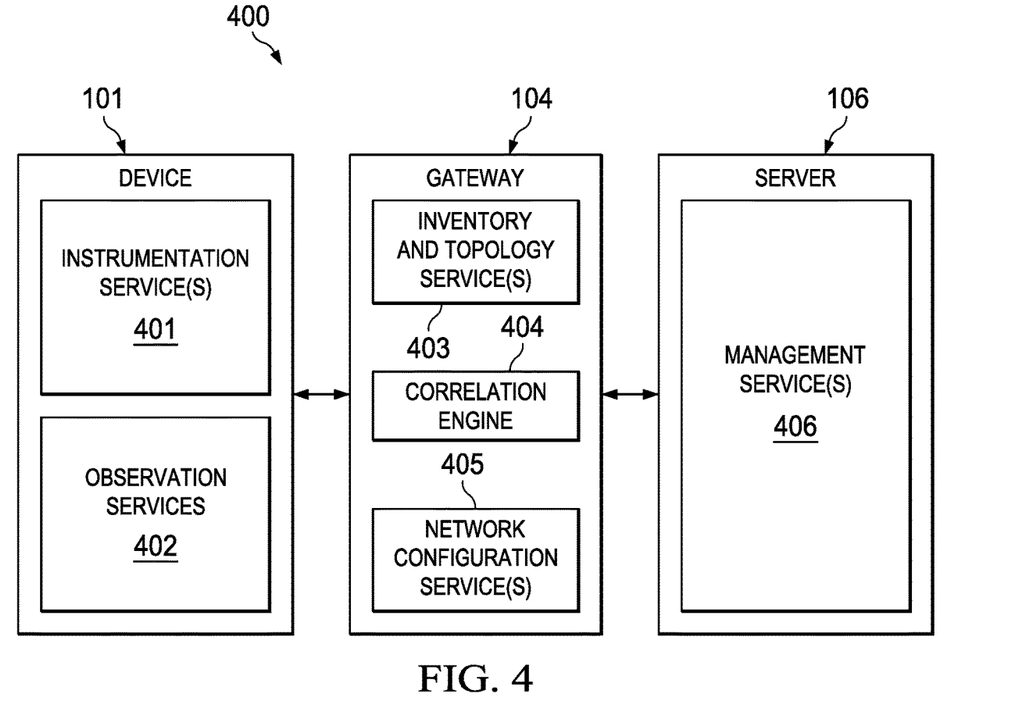
FIG. 4 illustrates an example of network configuration services according to some embodiments.

FIG. 4 illustrates an example of network configuration services according to some embodiments. Particularly, client device 101 includes instrumentation service(s) 401 and observation services(s) 402. In some implementations, services 401 and 402 may be part of application(s) 102 shown in FIG. 1. Gateway 104 includes inventory and topology service(s) 403, correlation engine or service(s) 404, and network configuration service(s) 405. Meanwhile, server(s) 106 includes management service(s) 406.

In various embodiments, instrumentation service(s) may be configured to provide instrumentation data related to device 101 to gateway 104. Examples of static instrumentation data include, for instance: device name (e.g., Joe5550, W10X7456), available connections (e.g., Wired 1Gb Ethernet network, Bluetooth, 4G, 801.22ac 5 GHz, 802.11ac 2.4 GHz), device type (e.g., Latitude 5550, D-Link AP, GW-5000), AP capabilities (e.g., support 5G to internet, accepting connections), MAC address per radio connect (e.g., MAC of wired, MAC of 5G, 2.4G), connection information (e.g., password to connect), cost optimization (e.g., switching between or to 4G and/or 5G, or enabling cellular data, for example, in response to emergencies only), location (e.g., on fixed device with no location based service), etc.

Conversely, examples of dynamic instrumentation data include, for instance: bandwidth needed to perform task, minimum acceptable latency, priority of current job (e.g., 1=security system, fire, or command for critical process control; . . . ; 5=room temperature), broadcast frequency (e.g., continuous, hourly, daily, weekly, etc.), duration of broadcast (e.g., continuous, # minutes), mobility (e.g., static forever, static 5 days, continuously mobile), current connections (e.g., Wired—LAN only, 100 Mb, WiFi—SSID PS3-3, 5 Ghz channel 152, 5 Mb, Internet), connection reliability per channel (e.g., always available, intermittent, not working now), location (e.g., from location based service), etc.

With respect to observation service(s) 402, devices 101 may passively listen for packets over their wired and wireless interfaces. In some embodiments, devices 101 may listen for all transmitted data independently of whether the device is the recipient of the data. As such, devices 101 are capable of identifying other neighboring devices. This feature may be enabled, for example, via software-defined radios. Additionally or alternatively, the feature may be implemented through modifications to firmware, software driver, or hardware.

When observation service(s) 402 receives data from its wireless radios, each of the radios receives traffic in that particular frequency band or channel. The device's hardware then passes those packets to the device's drivers and networking stack. Observation service(s) 402 may then report the signal strength with which a packet was received and metrics such as SNR, data-rate, transmit-rate, bandwidth, available frequency bands, interference across bands, etc.

As such, gateway 104 may receive data such as machine inventory on a regular basis ("all instrumentation from all machines every day"), machine inventory when notified of significant change (e.g., "I have relocated," "I have a new radio"), and observed environment (e.g., "all the radios I can detect").

When all devices in the network report instrumentation and observation information to gateway 104, inventory and topology service(s) 403 may build a topological map of all actual and possible communication channels in the IHS network. Again, there may be more than one path between any two network entities, each path representing a network interface, channel, and/or transmission direction over which they are capable of communicating. In some embodiments, inventory and topology service(s) 403 may maintain a real-time map of all connections in the IHS network, as the number of devices, network topology, service needs, and/or capacity change over time.

Correlation engine 404 may be configured, for example, to resolve conflicts between instrumentation information and observation information when building the topology map. Particularly, the observed environment is correlated to the advertised capabilities of the devices from their instrumentation. Reliability of information is weighted based upon selected attributes of the observing device.

For example, assume that a first device's instrumentation conflicts with a second device's observations regarding the first device. With respect to mobility attributes, if the first device is mobile and the second device is fixed, correlation engine 404 may resolve the conflict in favor of the observation information provided by the second device and may disregard the instrumentation information provided by the first device. Conversely, if the second device is transient and the first device is fixed, correlation engine 404 may resolve the conflict in favor of the instrumentation information provided by the first device and may disregard the observation information provided by the second device.

That is, when correlation engine 404 determines that a portion of the instrumentation data related to a given device does not match a corresponding portion of the observation data related to the given device, it may: (a) disregard the portion of the observation data related to the given device in response to the given device being a mobile device, or (b) disregard the portion of the instrumentation data related to the given device in response to the given device being a static device.

In some cases, a device may be classified as "hybrid" when it capable or being moved around, or in fact a mobile device; nonetheless it remains stationary for a selected amount of time. In those cases, if a device is mobile, its instrumentation and/or observation information may be weighted by "0," if a device is fixed that information may be weighed by "1," and if a device is hybrid it may be weighted by "0.5." Any suitable mathematical procedure may then be applied to determine a weighted average of the conflicting information.

With respect to seniority, if the first device has been deployed in the IHS network prior to the second device having been deployed, correlation engine 404 may resolve conflicts in favor of the information (instrumentation or observation) provided by the first device, and it may disregard the information provided by the second device.

With respect to the state of the art, if the first device is more modern or otherwise superior (e.g., manufacturer, type, model, version, processing power, etc.) to the second device, correlation engine 404 may resolve conflicts in favor of the information (instrumentation or observation) provided by the first device, and it may disregard the information provided by the second device.

With respect to reliability, if the first device is more reliable (e.g., fewer errors, higher SNRs, longer uptime, etc.) than the second device, correlation engine 404 may resolve conflicts in favor of the information (instrumentation or observation) provided by the first device, and it may disregard the information provided by the second device.

In some cases, correlation engine 404 may also be configured to resolve conflicts between different observations made by different devices. For instance, with respect to location, if a first device is closer to a second device than a third device, observations made by the second device with respect to the first device may also be considered more reliable than observations made by the third device with respect to the first device. Accordingly, correlation engine 404 may resolve conflicts in favor of the observation provided by the second device, and it may disregard the information provided by the third device.

In many embodiments, any combination of mobility, seniority, modernity, location, and/or reliability attributes may be used by correlation engine 404 to resolve conflicts on behalf of inventory and topology service(s) 403. In many cases, combining location information for every known device 101 creates a more sophisticated map of the IHS network.

As a result, inventory and topology service(s) 403 may generate a layout of the connectivity environment, including location (based instrumentation information and location based services) APs, devices with APs, what they can connect and route to, what QoS and bandwidth they can deliver, and how to connect to them. Additionally or alternatively, inventory and topology service(s) 403 may generate a layout of the device environment, including the services they need (e.g., QoS, bandwidth, routing, etc.) as described in their instrumentation.

Once the topology map and all connections are identified, inventory and topology service(s) 403 may assign an individual priority to each connection of each of the plurality of devices based upon the correlation, and independently of a different priority requested or indicated via the device's instrumentation information. Additionally or alternatively, inventory and topology service(s) 403 may assign priorities based upon a combination of the results of the correlation as well as the priority requested or indicated via the device's instrumentation information (e.g., a weighted average or the like). Moreover, inventory and topology service(s) 403 may change a priority of a connection of a given device based upon a determination that the given device has not reported information expected to be received.

Again, inventory and topology service(s) 403 may maintain a map of the network that can be used to improve routing decisions. The map may be based on historical and/or real-time data. The topological map may include a record of successful and unsuccessful transmissions, times and timing associated with those transmissions, the locations of the communicating devices, and interface(s) used to communicate. As devices 101 continue to report their locations, inventory and topology service(s) 403 can estimate the real-time topology of the IHS network and the connection strength between devices by combining the historical topology map with the real-time location of those devices.

Network configuration service(s) 405 may be configured to optimize the IHS network by reconnecting and prioritizing communications among devices 101 and gateway(s) 104 based upon the topology map and a set of rules. Particularly, configuration service(s) 405 may configure at least one of: a path, a channel, a timing, or a broadcast range of a communication between devices, between gateways, and between devices and gateways. Moreover, configuration service(s) 405 can re-evaluate the connection prioritization periodically based on actual performance from logs.

In some embodiments, devices may be reconnected based upon optimization rules. Management agent 102 may persist on the device and can enforce that the device make the requested change. In case of error, the change can be reversed or rolled over to a resolution connection. Reiterative re-inventory and re-analyzing operations may rebuild existing connections appropriately.

Particularly, network configuration service(s) 405 may connect devices to APs they can see which advertise stable connections most appropriate to their needs. For example, machines with slow connections, high bandwidth requirements, and high priority may be connected first, whereas machines with efficient connections, low bandwidth requirements and low priority may be connected last. In some cases, failovers are recorded, and high priority connections can request immediate reconnection/routing. Additionally or alternatively, alternate channels, protocols, or connections (e.g., Bluetooth, Alternate Wi-Fi, LAN) can be selected. Additionally or alternatively, devices can be instructed to change subnets or VLANs.

As a result, radio interference may be minimized, and efficiency and QoS may be maximized. Layout, inventory, and correlated observance information may be leveraged to build such an optimized network environment. Moreover, channel, power, frame size may be optimized for sending and receiving devices.

When server 106 is present, it may include management service(s) 406. In operation, management service(s) 406 may centrally manage a plurality of gateway(s) 104. When the same deployment includes several gateway(s) 104, for example, management service(s) 406 may provide an administrator with access to the network topology as identified by each of the gateways and/or devices.

In some cases, gateway(s) 104 may each include an agent similar to application(s) 102, and each gateway 104 may provide its own instrumentation and observation data to management service(s) 406, which may in turn execute some of the same operations outlined herein; but for a larger or distributed network environment.

In some implementations, management service(s) 406 of server 106 may establish QoS and/or other performance contracts across IHS network 100 based upon a selected goal of the overall system.

Figure 5:
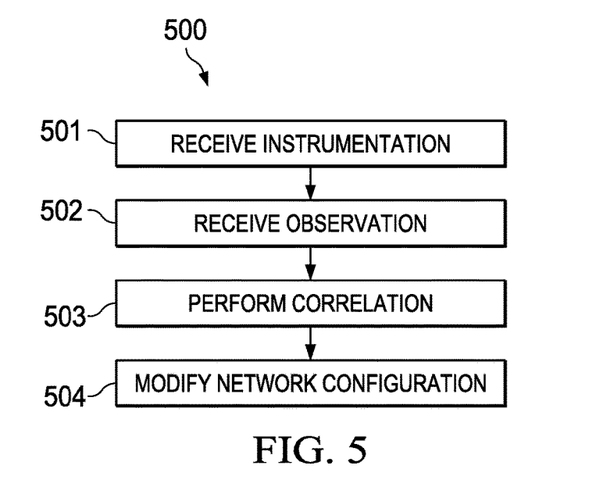
FIG. 5 illustrates an example of a method for managing network connections based on device profiles according to some embodiments.

FIG. 5 illustrates an example of method 500 for managing network connections based on device profiles. In some embodiments, method 500 may be performed, at least in part, by gateway 104. In other cases, method 500 maybe performed, at least in part, by server 106.

At block 501, method 500 includes receiving instrumentation data from device(s) 101. At block 502, method 500 includes receiving observation data from device(s) 101. Then, at block 503, method 500 includes performing a correlation operation between the instrumentation and the observation data. Finally, at block 504, method 500 includes modifying a configuration of IHS network 100 based upon the correlation.

D. EXAMPLES

According to certain techniques described herein, instrumentation on devices may describe them, their capabilities (radios and characteristics) and their network requirements. Devices and agents may be inventoried and evaluated, and classified based on their network types, transience, location, etc. Connections may be prioritized based on clues found in instrumentation relating to application needs (e.g., QoS, bandwidth, intermittency, etc.). Agents on devices may provide data on all the radios visible to each device and the strength, channel, etc. of each. Additional agents operating as "sniffers" may be deployed on additional devices if needed. Then, through radio and network management controls, devices may be connected to different APs (or other devices or radios of different types), altered in channel or signal strength, etc. Moreover, instrumentation and observation data may be resampled and the method may be repeated periodically and/or continuously.

The examples described below illustrate various implementations of method 500. Numerous such examples and combinations will be apparent to a person of ordinary skill in the art in light of the various teachings described herein:

Example A

A number of devices is physically dispersed within a premises (e.g., in a factory alongside a manufacturing line), such that an item physically moves within the premises (e.g., "down the line"). In a first time interval, the item may be closer to a first set of devices than a second set of devices and, in a second time interval, the item may be closer to the second set of devices than the first set of devices. In this case, modifying network configuration and/or configuring the communications may include: (a) prioritizing communications between the IHS and the first set of devices to the detriment of communications between the IHS and the second set of devices during the first time interval, and (b) prioritizing communications between the IHS and the second set of devices to the impairment of communications between the IHS and the first set of devices during the second time interval.

Example B

Additionally or alternatively, assume that a first device from the first set of devices has an initial connection speed requirement and an initial bandwidth requirement, and that a second device from the second set of devices has a second connection speed requirement and a second bandwidth requirement. If the second speed requirement is greater than the first speed requirement and the first bandwidth requirement is larger than the second bandwidth requirement, configuring the communications may include prioritizing a first connection with the first device over a second connection with the second device. In some cases, prioritization of the first device over the second device may occur during the first time interval. In other cases, however, prioritization and/or deprioritization of the first device over the second device may occur during the second time interval.

Example C

Additionally or alternatively, if a particular sensor has not been reliably reporting information because it is getting deprioritized over others and the resulting centralized analytics suffer, configuring the communications may include pushing a command to up that device's prioritization.

Example D

Additionally or alternatively, devices may raise their connection priority depending on whether they are actively part of a process at the moment. For example, if a machine (e.g., robot, pump, turbine, etc.) is actively performing an operation, it gets a priority channel. But, when in standby mode, it goes to a lower priority channel to maintain a heartbeat signal.

Example E

Additionally or alternatively, devices may have their connection priorities assigned based upon classes of owners of devices, which may distinguish between different types of end-users. For example, in a factory implementation, floor workers with mobile devices may get deprioritized over IoT sensors owned by the building, which is some cases may be configured to deliver information critical to the process and/or analytics.

Example F

Additionally or alternatively, entire domains may be prioritized. Devices tied to an Operations network become prioritized over anything else on the IoT network. Moreover, this approach may be used in a tiered fashion. For example, OT networks may have: Layer 0 ("field" devices or clients), Layer 1 ("control" devices or clients), Layer 2 (SCADA-CORE), Layer 3 (management (MES) devices or clients), and Layer 4 (enterprise devices or clients). In some cases, for example, Layer 1 devices may be assigned top priority.

Example G

Additionally or alternatively, devices may have their connection priorities assigned based upon user classification. For instance, information workers with client devices may be deprioritized over operations workers because, in the latter case, process and safety concerns may be involved.

Example H

Additionally or alternatively, devices may have their connection priorities assigned based on a temporal event. For example, in emergency situations, certain devices or domains may take over. In some cases, any devices associated with a fire suppression system, for example, may get priority over all other devices. This technique may also be extended to general time of day to accommodate work shifts, etc.

Example I

Additionally or alternatively, devices may have their connection priorities assigned based upon temporal and proximity information. For example, if a user is performing a critical operation or maintenance, his or her device may receive priority. It is noted that this particular example is different from example A, where one actor is a sensor network and the other is a worker.

Example J

Additionally or alternatively, devices may have their connection priorities assigned based upon any configurable device function or feature in its IoT environment (e.g., "critical always," "critical by time," and/or "critical by location."

Example K

Additionally or alternatively, devices may have their connection priorities assigned based upon trust. For example, unfamiliar or unauthorized devices or sensors on a network may be assigned lower (or no) priority.

Example L

Additionally or alternatively, devices may have their connection priorities assigned based upon directional flow. For instance, "northbound" traffic (e.g., from IoT devices to an IoT gateway), which tends to be the aggregate of device data and have analytics applied (e.g., information and not just data), may get priority over "southbound" traffic (from an IoT gateway to any of a plurality of IoT devices).

Example M

Additionally or alternatively, devices may have their connection priorities assigned based upon whether the device is set up to take control (e.g., for an actuator) or whether the device simply monitors process/state for analytics. In this particular case, for instance, traffic for applying control may always be prioritized, especially in critical processes and safety systems.

In various embodiments, examples A-M may be combined in any suitable manner, such that connections may be prioritized or deprioritized based upon any of the factors, features, or scenarios set forth in those examples. For instance, in one of many potential combinations between examples D and E, an IoT device's connection may be prioritized or deprioritized based upon classes of users, but the IoT sensors described in example E may be dynamically managed based upon whether that particular device is actively part of a process at that moment, and so on.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
receive instrumentation data from a first device among a plurality of devices coupled to the IHS via a network;
receive observation data about the first device from a second device among the plurality of devices;
determine that a portion of the instrumentation data does not match a corresponding portion of the observation data;
at least one of: (a) disregard the portion of the observation data in response to the second device being a mobile device, or (b) disregard the portion of the instrumentation data in response to the first device being a mobile device;
assign a first weight to the instrumentation data in response to the first device being a mobile device, or assign a second weight larger than the first weight to the instrumentation data in response to the first device being a fixed device;
assign a third weight to the observation data in response to the second device being a mobile device, or assign a fourth weight larger than the third weight to the observation data in response to the second device being a fixed device;
correlate the weighted observation data with the weighted instrumentation data; and
configure communications between the IHS and the first device based, at least in part, upon the correlation.

2. The IHS of claim 1, wherein at least one of the plurality of devices is static.

3. The IHS of claim 2, wherein instrumentation data includes at least one of: a device name, an available connection, a device type, an access point capability, a MAC address, a cost optimization selection, or a location.

4. The IHS of claim 2, wherein the instrumentation data includes at least one of: a job priority, a bandwidth needed, a broadcast frequency, a duration of broadcast, mobility, a minimum acceptable latency, or a connection reliability per channel.

5. The IHS of claim 1, wherein at least one of the plurality of devices is mobile.

6. The IHS of claim 1, wherein the observation data includes at least one of: a radio name, a signal strength, a signal-to-noise ratio, a data rate, a bandwidth, an available frequency band, or an interference across bands.

7. The IHS of claim 1, wherein configuring the communications includes configuring at least one of: a frequency channel, a transmit power, or a frame size.

8. The IHS of claim 1, wherein the program instructions, upon execution, further cause the IHS to, prior to performing the correlation, at least one of:
assign an intermediary weight to the instrumentation data in response to the first device being a hybrid device; or
assign an intermediary weight to the observation data in response to the second device being a hybrid device.

9. The IHS of claim 8, wherein the network includes an Internet-of-Things ("IoT") network.

10. The IHS of claim 9, wherein the program instructions, upon execution, further cause the IHS to change a connection priority of the first device based upon a determination that the first device has not reported information expected to be received by the IHS.

11. The IHS of claim 9, wherein the plurality of devices is physically dispersed within a premises, wherein an item physically moves within the premises, wherein, in a first time interval, the item is closer to a first set of devices than a second set of devices, wherein, in a second time interval, the item is closer to the second set of devices than the first set of devices, and wherein configuring the communications includes: (a) prioritizing communications between the IHS and the first set of devices to the detriment of communications between the IHS and the second set of devices during the first time interval, and (b) prioritizing communications between the IHS and the second set of devices to the detriment of communications between the IHS and the first set of devices during the second time interval.

12. The IHS of claim 11, wherein the first device is part of the first set of devices and has a first connection speed requirement and a first bandwidth requirement, wherein the second device has a second connection speed requirement and a second bandwidth requirement, wherein the second speed requirement is greater than the first speed requirement, wherein the first bandwidth requirement is larger than the second bandwidth requirement, and wherein configuring the communications includes prioritizing a first connection with the first device over a second connection with the second device.

13. The IHS of claim 12, wherein prioritization of the first device over the second device occurs during the first time interval.

14. The IHS of claim 12, wherein prioritization of the first device over the second device occurs during the second time interval.

15. The IHS of claim 1, wherein configuring the communications include configuring at least one of: a path, a channel, a timing, or a broadcast range of a communication between the first and second devices.

16. A memory device having program instructions stored thereon that, upon access by a logic circuit of an Information Handling System (IHS), enable the IHS to:
receive instrumentation data from a first device among a plurality of devices coupled to the IHS via a network, wherein the instrumentation data includes at least one of: a device name, an available connection, a device type, an access point capability, a MAC address, a cost optimization selection, a location, a job priority, a bandwidth needed, a broadcast frequency, a duration of broadcast, mobility, a minimum acceptable latency, or a connection reliability per channel;
receive observation data about the first device from a second device, wherein the observation data includes at least one of: a radio name, a signal strength, a signal-to-noise ratio, a data rate, a bandwidth, an available frequency band, or an interference across bands;
determine that a portion of the instrumentation data does not match a corresponding portion of the observation data;
at least one of: (a) disregard the portion of the observation data in response to the second device being a mobile device, or (b) disregard the portion of the instrumentation data in response to the first device being a mobile device;
assign a first weight to the instrumentation data in response to the first device being a mobile device, or assign a second weight larger than the first weight to the instrumentation data in response to the first device being a fixed device;
assign a third weight to the observation data in response to the second device being a mobile device, or assign a fourth weight larger than the third weight to the observation data in response to the second device being a fixed device;
correlate the weighted observation data with the weighted instrumentation data;
assign a connection priority to each connection of each of the first device based upon the correlation; and
configure communications between the IHS and the first device based, at least in part, upon the connection priorities, wherein configuring the communications includes configuring at least one of: a frequency channel, a transmit power, or a frame size.

17. The memory device of claim 16, wherein the program instructions, upon execution, further cause the IHS to, prior to performing the correlation, at least one of:
assign an intermediary weight to the instrumentation data in response to the first device being a hybrid device; or
assign an intermediary weight to the observation data in response to the second device being a hybrid device.

18. In an Information Handling System (IHS), a method comprising:
receiving instrumentation data from a first device among a plurality of devices coupled to the IHS via a network, wherein the instrumentation data includes at least one of: a device name, an available connection, a device type, an access point capability, a MAC address, a cost optimization selection, a location, a job priority, a bandwidth needed, a broadcast frequency, a duration of broadcast, mobility, a minimum acceptable latency, or a connection reliability per channel;
receiving observation data about the first device from a second device, wherein the observation data includes at least one of: a radio name, a signal strength, a signal-to-noise ratio, a data rate, a bandwidth, an available frequency band, or an interference across bands;
determining that a portion of the instrumentation data does not match a corresponding portion of the observation data;
at least one of: (a) disregarding the portion of the observation data in response to the second device being a mobile device, or (b) disregarding the portion of the instrumentation data in response to the first device being a mobile device;
assigning a first weight to the instrumentation data in response to the first device being a mobile device, or assigning a second weight larger than the first weight to the instrumentation data in response to the first device being a fixed device;
assigning a third weight to the observation data in response to the second device being a mobile device, or assigning a fourth weight larger than the third weight to the observation data in response to the second device being a fixed device;

correlating weighted the observation data with the weighted instrumentation data;

assigning a connection priority to each connection of each of the first device based upon the correlation; and configuring communications between the IHS and the first device based, at least in part, upon the connection priorities, wherein configuring the communications includes configuring at least one of: a frequency channel, a transmit power, or a frame size.

19. The method of claim 18, further comprising, prior to performing the correlation, at least one of:

assigning an intermediary weight to the instrumentation data in response to the first device being a hybrid device; or assigning an intermediary weight to the observation data in response to the second device being a hybrid device.

\* \* \* \* \*